Figure 1:
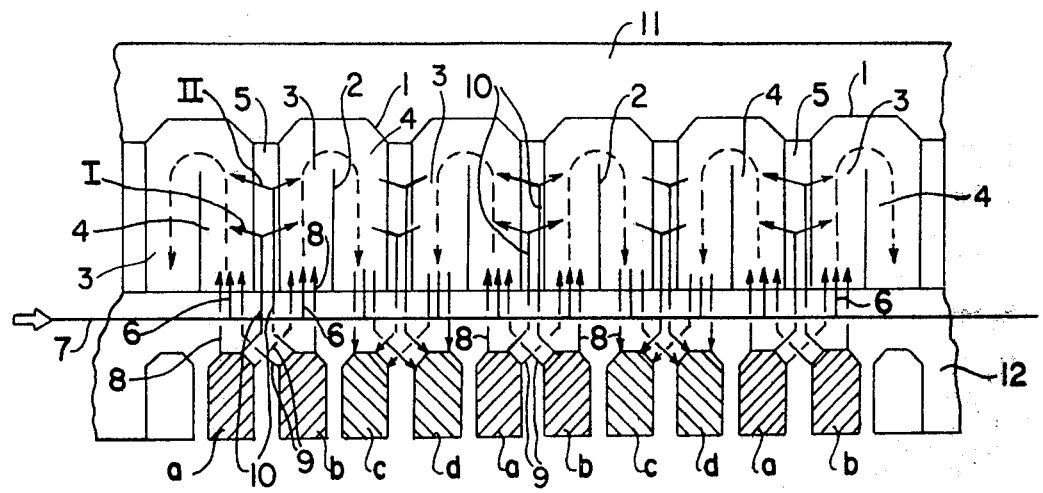

United States Patent [19]

Struck et al.

[11] 4,440,599

[45] Apr. 3, 1984

[54] HEATING SYSTEM FOR A COKE OVEN BATTERY HAVING TWIN-HEATING FLUES

[75] Inventors: Carl-Heinz Struck, Bochum; Ralf Schumacher, Hagen; Heinz Thubeauville, Bochum, all of Fed. Rep. of Germany

[73] Assignee: Dr. C. Otto & Comp. G.m.b.H., Bochum, Fed. Rep. of Germany

[21] Appl. No.: 447,198

[22] Filed: Dec. 6, 1982

[51] Int. Cl.³ ..................... C10B 21/06; C10B 21/18; C10B 21/22
[52] U.S. Cl. ................................... 202/141; 202/142; 202/144
[58] Field of Search ............................. 202/141–144, 202/151

[56] References Cited

U.S. PATENT DOCUMENTS

| | | | |
|---|---|---|---|
| 1,967,975 | 7/1934 | Schaefer | 202/143 |
| 2,203,285 | 6/1940 | Petsch | 202/144 |
| 3,366,372 | 1/1968 | Palumbo | 202/143 |
| 3,996,109 | 12/1976 | Pries | 202/142 |

FOREIGN PATENT DOCUMENTS 407023 2/1934 United Kingdom ................ 202/144

*Primary Examiner*—Bradley Garris
*Attorney, Agent, or Firm*—Thomas H. Murray; Clifford A. Poff

[57] ABSTRACT

There is disclosed a heating system for regeneratively heating a coke oven battery having twin-heating flues extending side-by-side transversely of the length of the coke oven battery. Halves of the twin-heating flues are separated by a flue midfeather that forms a gas flow space at the top thereof. Between twin-heating flues, there is a heating wall midfeather extending up to the oven crown. Regenerators below the oven sole extend transversely to the coke oven battery with each regenerator coupled by three passageways to the heating flues. Two regenerators are associated with each twin-heating flue. A first passageway extends to the bottom part of one-half of one twin-heating flue, a second passageway extends to the bottom part of one-half of an adjacent twin-heating flue with these two flue halves separated by a heating wall midfeather. A third passageway extends upwardly in the heating wall midfeather where branched passageways extend into the two heating flue halves of adjacent twin-heating flues at an elevation above the oven sole.

6 Claims, 2 Drawing Figures

HEATING SYSTEM FOR A COKE OVEN BATTERY HAVING TWIN-HEATING FLUES

BACKGROUND OF THE INVENTION

This invention relates to a heating system for regeneratively heating a coke oven battery by twin-heating flues arranged side-by-side to extend transversely of the oven battery. Each twin-heating flue includes a flue midfeather forming two flue parts interconnected by a gas flow space across the top of the flue midfeather and a heating wall midfeather extending from the sole to the crown of the coke oven between any two twin-heating flues. Regenerators arranged below the oven sole transversely to the oven battery communicate by various passageways that extend to different heights and in a manner such that two regenerators are associated with each twin-heating flue.

In a known heating system having twin-heating flues, the fuel gases and the air for combustion are supplied to corresponding halves of adjacent twin-heating flues. More specifically, the heating walls of such an oven consist of a multiple number of twin-heating flues arranged side-by-side. Gas and air are burned in an upflowing flue and burnt gases pass a turning point in the upgoing flue and flow downwardly through an adjacent flue part and into regenerators. Combustion takes place in every second flue during the reversing periods. The overall desired result is uniform combustion in adjacent twin-heating flues. To provide a vertically-staggered supply of air when heating with rich gas and to provide a vertically-staggered supply of air when heating with lean gas in this type of heating system, each twin-heating flue must have eight passageways. Namely, four regenerator discharge ports subdivided into eight component flows of gases. This form of heating system provides an asymmetrical construction in the zone of the regenerators.

SUMMARY OF THE INVENTION

It is an object of the present invention to improve the known twin-flue heating system for coke ovens, and more particularly to provide an improved heating system that reduces the number of passageways and provde a symmetrical arrangement of passageways in the zone of the regenerators.

More particularly, according to the present invention there is provided a heating system for coke oven chambers of a battery of coke ovens, the heating system including a plurality of twin-heating flues extending between coke oven chambers transversely to the length of the battery of coke ovens, a flue midfeather for dividing each twin-heating flue into two flue parts interconnected by a flow space across the top of the flue midfeather, an oven crown, an oven sole, a heating wall midfeather extending from the oven sole to the oven crown between each of the twin-heating flues, and regenerators extending below the oven sole transversely of the battery of coke ovens, three passageways extending from each regenerator in a manner such that two regenerators communicate with each twin-heating flue, the three passageways comprising a first passageway extending into the bottom of a first flue part of a first twin-heating flue, a second passageway extending into the bottom of a first flue part of an adjacent twin-heating flue which is separated by one of the heating wall midfeathers from the first twin-heating flue, and a third passageway rising in the last-mentioned heating wall midfeather and having branched passageways communicating with each of the first flue parts.

Thus, the present invention provides in a heating system of the known twin-heating flue type, that the flow of gases in the adjacent twin-heating flues is not along the same corresponding flow paths as is conventional but, instead, the flow of gases occurs countercurrently along the same corresponding flow paths in adjacent twin-heating flues. According to the present invention, three passageways are provided to extend from each regenerator, a first passageway extending to the bottom part of one-half of one twin-heating flue, a second passageway extending to the bottom part of an adjacent half of an adjacent twin-heating flue, the same being separated by a heating wall midfeather that extends up to the oven crown, and a third passageway rising in the last-mentioned heating wall midfeather in a manner so that branched passageways extend into the adjacent halves of the twin-heating flues above the oven sole.

Preferably, gas-exit orifices of the two passageways which rise in the heating wall midfeather are situated so that gases enter the heating flues at different heights along the heating wall midfeather which extends right up to the oven crown. In this case, according to the present invention a number of vertically-staggered, gas-exit orifices for communicating with the heating flues can be associated with each of the two passageways in the heating wall midfeather.

Countercurrent combustion takes place in the twin-heating flues in a pair-like manner, i.e., the flow of gases is in opposite directions in corresponding parts of adjacent pairs of twin-heating flues with a staggered supply of air or air and lean gas, thereby enabling a reduction from the conventional eight passageways to six passageways. The manner of supplying air or air and lean gas enables a completely asymmetrical construction in the regenerator zone to insure a uniform supply of gaseous media to the regenerator chambers. For instance, when heating with lean gas, two-thirds of the required quantity of gas and air can be supplied through an opening at the sole of the heating flue and the remaining one-third of lean gas can be supplied at a first elevation with the remaining quantity of air supplied at the second elevation along the heating wall midfeather. This feature greatly decreases the risk of overheating the top of the heating flues, i.e., at the flow-reversal area in the twin-heating flues.

Figure 2:
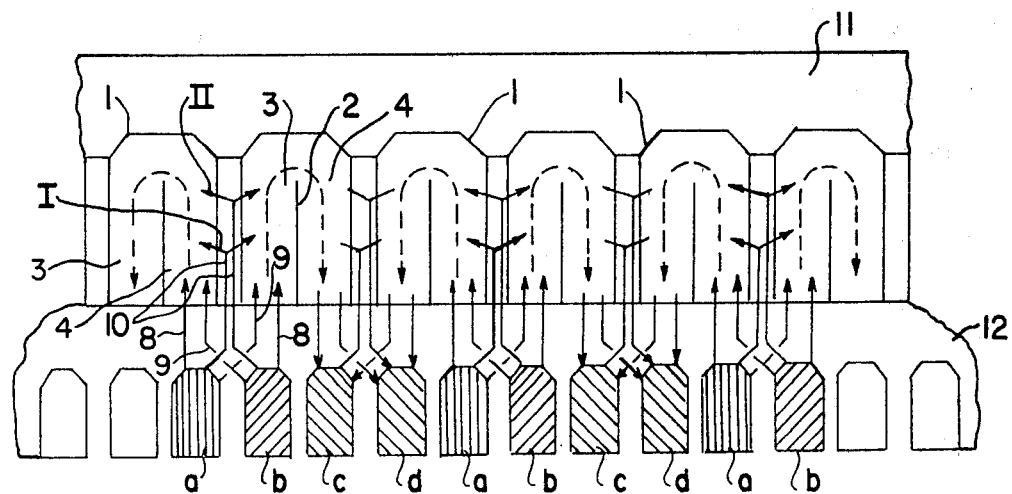

These features and advantages of the present invention as well as others will be more fully understood when the following description of two embodiments of the present invention is read in light of the accompanying drawings, in which:

FIG. 1 is a diagrammatic view transversely of a coke oven battery of a heating system according to the present invention for heating a coke oven with rich gas; and FIG. 2 is a diagrammatic view transversely of a coke oven battery of a heating system similar to FIG. 1 but for heating a coke oven with lean gas.

A plurality of twin-heating flues 1 is formed of refractory brick and arranged in a side-by-side manner as illustrated in FIGS. 1 and 2. The flues form part of a heating wall for a coke oven chamber in a battery of coke ovens. A flue midfeather 2 divides each twin-heating flue into two flue parts or flue halves 3 and 4 which are interconnected by a flow space across the top of the flue midfeather. An oven crown 11 extends across the top of the twin-heating flues and an oven sole 12 extends across the bottom of the flues. A heating wall midfeather 5 separates every twin-heating flue 1 from one another by extending vertically between two flues from the oven sole to the oven crown. The heating gases are supplied in a manner which is known in the art for coke ovens having twin-heating flues to one-half or one flue part of a twin-heating flue together with air for supporting combustion. The gaseous media pass through the flow space across the top of a flue midfeather into the other flue part or flue half of a twin-heating flue from which the gases are removed. The operation of the flues is reversed after a half period, i.e., the gases flow in the opposite direction during the second half period. Regenerators are disposed below the oven sole to regeneratively preheat air for supporting combustion or, in the case of lean-gas heating, to regeneratively preheat air and lean gas for combustion.

According to the present invention, the twin-heating flues for an oven chamber when heated with rich gas, as shown in FIG. 1, are supplied with rich gas by lines 6 extending to the bottom part of the heating flue. Lines 6 generally extend through the oven sole and branch off from a rich-gas main 7. Lines 6 extend to each half of a twin-heating flue. However, in the heating flue system according to the present invention, any two adjacent flue halves 3 and 4 of two adjacent twin-heating flues which are separated by a heating wall midfeather 5 extending up to the oven crown are supplied with gas during a heating half period.

Two regenerators or regenerator chambers identified by reference characters a and b in FIG. 1 are associated with each twin-heating flue such that air required for combustion of rich gas is preheated before entering the heating flues. During this half period of operation, the flue gases pass from the remaining halves of the twin-heating flues and enter identically-constructed regenerators or regenerator chambers identified in FIG. 1 by reference characters c and d. Three passageways 8, 9 and 10 extend from each regenerator a, b, c and d. From regenerator a, passageway 8 extends to the bottom part of one flue half 4 of a twin-heating flue 1. A second passageway 9 from regenerator a extends to the bottom part of the adjacent flue half 3 of an adjacent twin-heating flue. From regenerator b, passageway 8 extends to the bottom part of flue half 3 and passageway 9 extends to an adjacent flue half 4 of an adjacent twin-heating flue. From regnerator c, passageway 8 communicates with the bottom of one flue half 4 and passageway 9 communicates with an adjacent flue half 3 of an adjacent twin-heating flue. From regenerator d, passageway 8 communicates with the bottom of one flue half 3 and passageway 9 communicates with an adjacent flue half 4 of an adjacent twin-heating flue. The flue halves which communicate with passageways 8 and 9 are separated from one another by a heating wall midfeather 5 and thus do not form part (i.e., feed gases) of the same twin-heating flue. A third passageway 10 from each of the regenerators a, b, c and d extends in a generally vertical direction and rises within heating wall midfeather 5 to elevations where branch lines of the third passageways 10 extend to each of the adjacent flue halves 3 and 4 of adjacent twin-heating flues at sites which are spaced above the oven sole.

Preferably, exit orifices of the branch lines of the third passageways 10 enter the flue halves at different heights. In the embodiment shown, the exit orifices for the branches of the third passageways 10 from regenerators a and c enter at level I; whereas the exit orifices of the branches to the third passageways 10 from regenerators b and d enter at level II. In FIG. 1, arrows indicate the direction of flow of rich gas and of preheated air from regenerators a and b as well as the flow of flue gas into the successively-arranged two regenerators c and d. In contrast to the conventional operation of a coke oven battery having twin-heating flues, combustion in the heating system of the present invention proceeds on a countercurrent basis, e.g., in flue part 4 of adjacent twin-heating flues.

FIG. 2 illustrates the operation of a heating system according to the present invention using lean gas. In FIG. 2, the construction and relationship of parts are exactly the same as already described for rich-gas heating except that in FIG. 2, the rich-gas supply lines are omitted for improved clarity. In contrast to the heating system of FIG. 1 wherein air is preheated in two regenerators a and b, when heating with lean gas according to the present invention as shown in FIG. 2, regenerator a is used for preheating the lean gas and regenerator b is used for preheating air. The arrangement of passageways 8, 9 and 10 for lean-gas heating is the same as for heating with rich gas. Each regenerator has three passageways. Preheated lean gas is fed from regenerator a throough passageway 8 into flue half 4 of a first twin-heating flue 1 and from the same regenerator, preheated lean gas is fed through passageway 9 into an adjacent flue half 3 of an adjacent twin-heating flue. These two flue halves are separated by the heating wall midfeather 5. The preheated lean gas is also fed from regenerator a through passageway 10 in the heating wall midfeather and fed by branched passageways into the last-mentioned two heating flue halves 3 and 4. The branched passageways feed preheated lean gas to enter from the heating wall midfeather which extends the full length of the heating flue for discharging gas at level I. Preheated air issues from regenerator b through the first passageway 8 into a flue half 3, through a second passageway 9 into a flue half 4 and at level II from branched passageways of passageway 10 in the full length heating wall midfeather 5 into flue halves 3 and 4 of adjacent twin-heating flues. As in the embodiment of the invention described in regard to FIG. 1, the direction of flow of heating gases and of flue gases is indicated by arrows in FIG. 2. The flue gas enters the two regenerators c and d during the heating half period as depicted by arrows in FIG. 2.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A battery of coke ovens with coke oven chambers having a heating system therefor, said heating system including a plurality of twin-heating flues extending between said coke oven chambers transversely to the length of said battery of coke ovens, a flue midfeather for dividing each twin-heating flue into two flue parts interconnected by a flow space across the top of said flue midfeather, an oven crown, an oven sole, a heating wall midfeather extending from said oven sole to said oven crown between each of said twin-heating flues, and regenerators extending below said oven sole transversely of said battery of coke ovens, three passageways extending from each regenerator in a manner such that two regenerators communicate with each twin-heating flue, said three passageways comprising a first passageway extending into the bottom of a first flue part of a first twin-heating flue, a second passageway extending into the bottom of a first flue part of an adjacent twin-heating flue which is separated by one of said heating wall midfeathers from said first twin-heating flue, and a third passageway rising in the last-mentioned heating wall midfeather and having a branched passageway communicating with each of said first flue parts.

2. The coke oven battery according to claim 1 wherein said branched passageway for each of two regenerators communicates with each twin-heating flue by extending to different heights in the same heating wall midfeather.

3. The coke oven battery according to claim 2 wherein said heating wall midfeather includes a plurality of vertically-spaced exit orifices communicating with each twin-heating flue at opposite sides thereof.

4. The coke oven battery according to claim 3 wherein said third passageway for each of two of said regenerators extends in said heating wall midfeather for communicating with each twin-heating flue at opposite sides of the heating wall midfeather.

5. The coke oven battery according to claim 1 wherein said heating wall midfeather includes a plurality of vertically-spaced exit orifices communicating with each twin-heating flue at opposite sides thereof.

6. The coke oven battery according to claim 5 wherein said third passageway for each of two of said regenerators extends in said heating wall midfeather for communicating with each twin-heating flue at opposite sides of the heating wall midfeather.

* * * * *

UNITED STATES PATENT OFFICE
CERTIFICATE OF CORRECTION

Patent No. 4,440,599      Dated April 3, 1984

Inventor(s) Carl-Heinz Struck et al

It is certified that error appears in the above-identified patent and that said Letters Patent are hereby corrected as shown below:

On the title page add Item [30]:

-- Foreign Application Priority Data

December 14, 1981 [DE] Fed. Rep. of Germany...3149484 --.

Signed and Sealed this

Fourth Day of September 1984

[SEAL]

Attest:

GERALD J. MOSSINGHOFF

Attesting Officer     Commissioner of Patents and Trademarks